(No Model.)

J. F. O'HARA & R. H. KAULFUSS.
GOLD LEAF CUTTER.

No. 394,717. Patented Dec. 18, 1888.

WITNESSES:
John McDeemer
C. Sedgwick

INVENTOR:
J. F. O'Hara
R. H. Kaulfuss
BY Munn & Co.
ATTORNEYS.

UNITED STATES PATENT OFFICE.

JAMES F. O'HARA AND ROBERT H. KAULFUSS, OF BROOKLYN, NEW YORK.

GOLD-LEAF CUTTER.

SPECIFICATION forming part of Letters Patent No. 394,717, dated December 18, 1888.

Application filed March 6, 1888. Serial No. 266,356. (No model.)

*To all whom it may concern:*

Be it known that we, JAMES F. O'HARA and ROBERT H. KAULFUSS, both of the city of Brooklyn, in the county of Kings and State of New York, have invented a new and Improved Gold-Leaf Cutter, of which the following is a full, clear, and exact description.

Our invention consists in the peculiar construction and arrangement of parts, as will hereinafter be fully described, and pointed out in the claim.

Reference is to be had to the accompanying drawings, forming a part of this specification, in which similar letters of reference indicate corresponding parts in both the figures.

Figure 1:
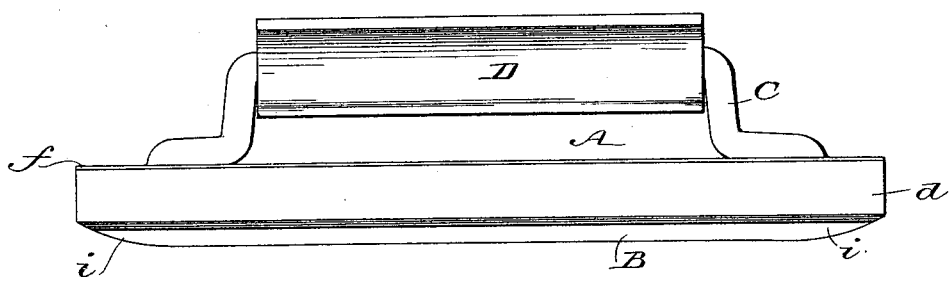
Figure 2:
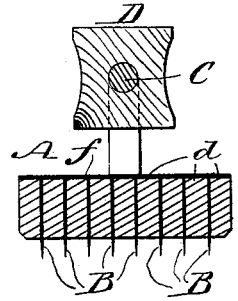

Figure 1 is a side elevation of our new and improved gold-leaf cutter, and Fig. 2 is a transverse sectional elevation of the same.

A represents the stock, and B the blades or knives set into the lower surface of the stock A parallel with each other and a suitable distance apart, as shown in Fig. 2. The stock A is provided at its upper surface with the iron C, to which is applied the handle D, and said stock is, by preference, made of several strips or plates $d\ d$, between which the blades B are placed, and then the whole are soldered, brazed, or otherwise secured together. We prefer to solder the strips and blades together by a layer, $f$, of solder on the top of the stock, by which solder the handle-iron C is also secured to the stock. The blades B are beveled or rounded at each end, as shown at $i$, so that the knife may be rocked to effectively cut the leaf, and so that the leaf or strips cut will not cling to the blades.

By the use of this device gold and other leaf may be rapidly cut into several narrow strips at a time, and the strips will be all of the same width, and there need be but little, if any, waste of gold.

Having thus described our invention, what we claim as new, and desire to secure by Letters Patent, is—

As a new article of manufacture, a gold-leaf cutter composed of several strips, $d$, and interposed knives B, beveled at their ends, as shown at $i$, the whole being united by solder, $f$, in combination with the handle-iron C, held by the solder $f$, and the handle D, substantially as described.

JAMES F. O'HARA.
        ROBERT H. KAULFUSS.

Witnesses:
  SAMUEL H. WILSON,
  MICHAEL F. HARTE.